United States Patent
Blease et al.

(10) Patent No.: US 6,878,763 B2
(45) Date of Patent: Apr. 12, 2005

(54) FREE RADICAL POLYMERIZATION USING ACIDIFIED ETHOXYLATED CONJUGATED FATTY ETHER SURFACTANTS

(75) Inventors: Trevor Graham Blease, Stockton on Tees (GB); Johny Denis Grade, Meldert (BE)

(73) Assignee: Imperial Chemical Industries PLC, London (GB)

( * ) Notice: Subject to any disclaimer, the term of this patent is extended or adjusted under 35 U.S.C. 154(b) by 0 days.

(21) Appl. No.: 10/123,527

(22) Filed: Apr. 17, 2002

(65) Prior Publication Data

US 2003/0092806 A1 May 15, 2003

Related U.S. Application Data

(63) Continuation of application No. 09/597,066, filed on Jun. 20, 2000, now abandoned, which is a continuation of application No. PCT/GB98/03829, filed on Dec. 18, 1998.

(30) Foreign Application Priority Data

Dec. 20, 1997 (GB) .............................................. 9726890

(51) Int. Cl.$^7$ ................................................ C08F 2/26
(52) U.S. Cl. ........................ 524/140; 524/145; 524/366; 524/368; 524/832; 526/193; 526/328; 526/328.5; 526/911
(58) Field of Search ................................ 524/145, 243, 524/155, 320, 366, 368, 832, 140; 526/193, 214, 328, 328.15, 911, 328.5

(56) References Cited

U.S. PATENT DOCUMENTS

| 2,606,178 | A | * | 8/1952 | Kosmin ....................... 526/209 |
| 4,283,321 | A | * | 8/1981 | Chakrabarti et al. ........ 524/747 |
| 5,990,342 | A | * | 11/1999 | Tsuzuki et al. ............. 560/183 |
| 6,335,314 | B1 |  | 1/2002 | Salter et al. |
| 6,590,030 | B2 |  | 7/2003 | Salter et al. |

FOREIGN PATENT DOCUMENTS

| AU | PO 8462 | 8/1997 |
| BE | 630 043 | 7/1963 |
| EP | 0026932 | 4/1981 |
| EP | 0755947 | 1/1997 |
| WO | WO 99/07673 | 2/1999 |
| WO | WO 9907673 A1 * | 2/1999 | ......... C07C/305/04 |

* cited by examiner

Primary Examiner—Kelechi C. Egwim
(74) Attorney, Agent, or Firm—Mayer Brown Rowe & Maw LLP

(57) ABSTRACT

The free radical initiated addition polymerization of ethylenically unsaturated, particularly acrylic monomers in which the dispersed phase is stabilised by a surfactant including at least one anionic surfactant compound of the formula (I): $R^1—(OA)_n—X$ where $R^1$ is $C_{16}$ to $C_{22}$ hydrocarbyl including at least two double bonds; OA is oxyalkylene group; n is from 2 to 60; and X includes at least one acidic H atom, and is particularly a phosphate ester group, or a salt thereof, is described. The use of the surfactants of the formula (I) enable efficient emulsification and thus polymerization at temperatures above those at which non-ionic unsaturated surfactants are effective. The polymer latex products give polymer films having good water resistance properties.

8 Claims, No Drawings

FREE RADICAL POLYMERIZATION USING ACIDIFIED ETHOXYLATED CONJUGATED FATTY ETHER SURFACTANTS

CROSS-REFERENCE TO RELATED APPLICATIONS

This is a continuation of National Application No. 09/597,066, filed Jun. 20, 2000, now abandoned, which, in turn, was a continuation of PCT/GB98/03829, filed Dec. 18, 1998, which designated the United States and was published in English. These applications, in their entirety, are incorporated herein by reference.

This invention relates to the free radical initiated addition polymerisation of unsaturated monomers in the presence of surfactants including anionic non-migratory surfactants, in particular emulsion polymerisation methods using such surfactants and specifically to the manufacture of acrylic polymers by oil-in-water emulsion polymerisation methods using such surfactants.

PCT published Application No WO/13849 A describes fatty alcohol ethoxylates of certain unsaturated alcohols and their use as surfactants in oil-in-water emulsion polymerisation methods. The unsaturated alcohols described are conjugated doubly unsaturated fatty alcohols derived from linoleyl alcohol. Conjugated double bonds are said to aid incorporation of the surfactant in the polymer making the surfactant non-migratory. Whilst these compounds can be effective, their use is limited because they are not effective surfactants at the temperatures usually used in emulsion polymerisations. In the polymerisation Example of WO/13849 A a "conjugated linoleyl" 10-ethoxylate is used in an emulsion polymerisation run at 30° C., whereas commercial thermally initiated emulsion polymerisations are typically run at from 50 to 100° C., usually 60 to 90° C. The use of lower temperatures results in significantly lower polymerisation rates thus drastically reducing the productivity of the reaction. Operation at higher temperatures might be possible by using much higher levels of ethoxylation, but this reduces the weight efficiency of the surfactants and may have deleterious effects on the polymerisation or on the polymer emulsions in use. These surfactants are also relatively inefficient during the particle nucleation stage of polymerisation.

The present invention adopts a different approach to enabling polymerisation at desirable higher temperatures by using anionically modifying conjugated unsaturated fatty alcohol ethoxylate surfactants. Such anionically modified surfactants can be used at temperatures significantly higher than is possible using the unsaturated fatty alcohol moderate ethoxylates of the prior art without the molecular weight penalty and other disadvantages of very high ethoxylates. They are also very efficient during particle nucleation, including at elevated temperatures e.g. 60 to 100° C., thus enabling the manufacture of product polymers with particles having a controlled smaller particle size without requiring the use of other surfactants especially at the particle nucleation stage. We believe that the anionically modified surfactants are to a large extent covalently grafted into the product polymer and latices made with these polymers have improved water resistance against blushing and absorb less water than conventional products.

Accordingly, the present invention provides a method of free radical initiated addition polymerisation of at least one ethylenically unsaturated monomer in which the dispersed phase is stabilised by a surfactant including at least one anionic surfactant compound of the formula (1):

$$R^1-(OA)_n-X \qquad (I)$$

where $R^1$ is a $C_{16}$ to $C_{22}$ hydrocarbyl group including at least two double bonds;

OA is an oxyalkylene group;

n is from 2 to 60, desirably 5 to 30; and

X is a group including at least one acidic H atom, or a salt thereof

The method of this invention is particularly applicable to emulsion polymerisation, especially the oil-in-water emulsion polymerisation of ethylenically unsaturated monomers. In particular, the method is applicable to the polymerisation of systems using or including acrylic monomers and/or vinyl monomers, particularly in oil-in-water emulsion polymerisation. These form particular aspects of the invention.

The group $R^1$ is a $C_{16}$ to $C_{22}$ hydrocarbyl group including at least two double bonds. In particular it is a $C_{18}$ or $C_{20}$ unsaturated hydrocarbyl group such as an unsaturated alkyl group. Desirably, at least two of the double bonds are conjugated, and in particular the group $R^1$ includes two double bonds and these double bonds are conjugated. Particularly desirable groups $R^1$ are of the formula:

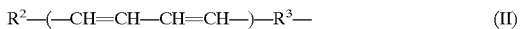

$$R^2-(-CH=CH-CH=CH-)-R^3- \qquad (II)$$

where $R^2$ is a $C_1$ to $C_8$ alkyl group, particularly a group $CH_3.(CH_2)_l$ where l is from 0 to 7; and $R^3$ is a $C_4$ to $C_{12}$ alkylene group particularly a group $(CH_2)_m$ where m is from 4 to 12.

In this case the compound of the formula (1) is of the formula (1a):

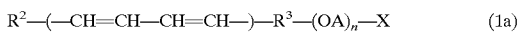

$$R^2-(-CH=CH-CH=CH-)-R^3-(OA)_n-X \qquad (1a)$$

where $R^2$, $R^3$, OA, n and X are as defined above.

The desirably conjugated, double bond system is preferably not terminal in the overall hydrocarbyl group. In particular, referring to the formula (II), the group $R^2$ desirably contributes chains of at least 2 carbon atoms, more usually at least 3 and preferably at least 4 carbon atoms to the overall hydrocarbyl chain; correspondingly l is desirably at least 2 and preferably at least 3. We have obtained good results when the group $R^1$ is the residue of an alcohol, $R^1OH$, which is desirably a conjugated isomer of linoleyl alcohol. These residues are residues of the formula (II) in which $R^2$ is n-pentyl or n-hexyl (l=4 or 5) and $R^3$ is correspondingly n-nonyl or n-octyl (m=9 or 8), derived from whichever of the two double bonds in linoleyl alcohol: $CH_3(CH_2)_4.CH=CH.CH_2.CH=CH.(CH_2)_7CH_2OH$ moves to form a conjugated system. The residues can be derived from the corresponding alcohol which can be made by rearrangement e.g. under strong base catalysis, and the alcohol used in the synthesis of the surfactant or the residues can be made in situ by allowing the rearrangement to take place during surfactant synthesis e.g. under alkali catalysis during alkoxylation of linoleyl alcohol. When derived from linoleyl alcohol in this way the product will be a mixture of compounds with the two conjugated unsaturation patterns, typically containing approximately equal amounts of each compound. Other doubly unsaturated residues can be made from corresponding natural source materials by similar methods. Other potential double unsaturated derivatives include alkoxyiates of abietyl alcohol (the alcohol derived from reduction of the carboxyl group in abietic acid; systematically named as 1, 2, 3, 4, 4a, 5, 6, 10, 10a-decahydro-1, 4a-dimethyl-7-(1-methylethyl)-1-hydroxymethyl-phenanthrene).

Typically, when alcohols derived from natural sources are used, the doubly unsaturated material will be available in mixture with other similar compounds having different levels of unsaturation. Mixtures of doubly unsaturated alcohol residues with singly unsaturated residues and even proportions of saturated residues can be used. Generally it is desirable that the proportion of multiple, especially double, unsaturated $R^1$ residues is at least 15 mole %, desirably at least 40 mole %, and preferably at least 50 mole %. Typical commercially available double unsaturated materials contain from 40 to 65 mole°/a commonly about 50%, double unsaturated residues. Such materials can be used satisfactorily in this invention. Materials having higher levels of double unsaturated residues may provide additional benefits but are significantly more expensive.

The group X is a group including at least one acidic H atom or a salt thereof, by which we mean that the group X can be ionised to form an anionic group in an aqueous medium. In use the group X functions to provide an anionic function making the surfactant an anionic surfactant. The anionic functionality can be provided by a phosphorus acid group, a sulphur acid group or a carboxylic acid group. Suitable phosphorus acid groups include phosphate: —O—P—(O)(OH)$_2$ and monoester phosphate —O—P—(O)(OR$^4$)(OH), where $R^4$ is an ester forming group, typically a group of the formula $R^1$—O—(OA)$_n$—, where $R^1$, OA, and n are as defined above for formula (1) and is usually the same as the other group $R^1$—O—(OA)$_n$— defined in formula (I), sulphur acid groups include sulphate: O—S—(O)$_2$—OH, sulphonate: —R$^5$—S—(O)$_2$—OH, where $R^5$ is a $C_2$ to $C_6$ alkyiene group, particularly a —C$_3$H$_6$— group or a —C$_2$H$_4$— group (giving X as a isethionate: —C$_2$H$_4$—S—(O)$_2$—OH group), and suitable carboxylic acid groups include carboxymethoxy: —O—CH$_2$—CO$_2$H, maleate: =O—(O)C—CH=CH—CO$_2$H, succinnate: —O—(O)C—CH$_2$—CH$_2$—CO$_2$H and sulphosuccinate —O—(O)C—[C$_2$H$_3$(SO$_3$H)]—CO$_2$H.

When the anionic functionality is provided by a phosphorus acid group, it is generally desirable that the surfactant contains a high proportion, in particular at least 50%, more usually at least 60% and especially at least 65°/a, of the surfactant is of the formula $R^1$—(OA)$_n$—O—P—(O)(OH)$_2$ where $R^1$, A and n are as defined in formula (I) i.e. a phosphate ester having one unsaturated alcohol residue.

The anionic group can be introduced into the molecule by methods generally known in the art.

Mostly these are by reaction of a compound $R^1$—O—(OA)$_n$—OH with suitable reactive anionic compounds. For example, compounds where X is phosphate or ester phosphate can be made by reaction of a compound $R^1$—O—(OA)$_n$—OH with polyphosphoric acid, phosphorus pentoxide, oxychloride or trichloride. The reaction produces a statistical mixture of mono-, di- and tri-ester products and the proportions can be controlled to increase the proportion of the desired compound by varying the proportions of the starting materials. Sulphates can be made by reacting a compound $R^1$—O—(OA)$_n$—OH with sulphuric acid and sulphonates by reacting such a compound with an hydroxy-alkylenesulphonate e.g. isethionic acid, or where $R^5$ is a 1,3 propylene group with propylene sultone. Carbomethoxy end groups can be provided by reaction of the alkoxylated alcohol with a-haloacetic acid or an acrylate ester under suitable conditions or by controlled oxidation of the terminal ethoxy group in a polyethoxylate. Maleate and succinate end groups can be provided by esterification reactions with the corresponding anhydride and the sulphosuccinate by onward reaction of the maleate ester product with sodium bisulphite.

The salt forming moiety, when present, can be alkali metal, particularly Li, Na or K, ammonium, including amine or hydroxy-substituted amine e.g. alkanolamine, onium, or amine, particularly alkyiamine, especially tertiary alkylamine and hydroxy-substituted amine e.g. alkanolamine, especially tertiary alkanolamine such as triethanolamine. Salts can generally be made from free acid precursors by direct reaction with an appropriate base.

The oxyalkylene group OA is usually a group of the formula: —(OC$_m$H$_{2m}$)— where m is typically 2, 3 or 4, desirably 2 or 3, i.e. an oxyethylene or oxypropylene group. The polyoxyalkylene chain may be wholly of oxyethylene residues or, less generally desirably, wholly of oxypropylene residues, or it may include both oxyethylene and oxypropylene residues to give a random or block copolymer chain. Generally, it is desirable that the chain is a homopolymeric polyoxyethylene chain.

The value of n will generally be chosen to provide the desired properties in the intended product. Typically, where the polyoxyalkylene chain is a polyoxyethylene chain it will usually have 2 to 60, more usually 5 to 30 oxyethylene residues and where it is a polyoxypropylene chain it will usually have 2 to 30 oxypropylene residues. Where the chain is a block or random copolymer of oxyethylene and oxypropylene residues the chain length chosen will typically correspond to the above ranges but numerically according to the proportion of oxyethylene and oxypropylene residues in the chain. In copolymer chains usually oxyethylene residues will provide at least 50 mole % of the total oxyalkylene residues. Oxybutylene residues can be included in the chain, but when present these will usually be present as a minor component of the chain e.g. up to about 20 mole % of the total polyoxyalkylene chain.

Of course, numerical values of numbers of repeat units in the polyoxyalkylene chain are average values. As is common to surfactants containing a polyoxyalkylene chain, the higher the proportion of oxyethylene residues, and the longer the polyoxyethylene chain, and the more hydrophilic the product.

The ethylenically unsaturated monomers that can be polymerised include unsaturated carboxylic acids and their alkyl esters, amides, N-substituted amides and nitrites, aromatic vinyl compounds, diene compounds which may be included as monomers or specifically as crosslinking agents, vinylethers, vinylesters, olefines and hydrophobic allyl compounds.

Unsaturated carboxylic acids and their derivatives include acrylic species including alpha alkyl, especially methyl species, such as (meth)acryiic acid and (meth)acrylate esters including alkyl and hydroxyalkyl (meth)acrylates, such as methyl methacrylate and vinyl (meth)acrylate; acrylonitrile and methacrylonitrile; and water insoluble (meth) acrylamides such as acrylamide, N-isopropylacrylamide and N-methylol(meth)acrylamide; including cationic and quaternary species; alkanediol (meth)acrylates such as (poly) ethyleneglycol di(meth)acrylates and methoxypolyethylenegtycol (meth)acrylates, urethane acrylates and epoxy acrylates; fumaric acid, maleic acid and anhydride and itaconic acid and their esters, particularly dialkyl maleates, dialkyl fumarates, dialkyl itaconates, amides and imides.

Vinylic species include halides such as vinyl halides, especially vinyl chloride, and vinylidene halides, especially vinylidene chloride, vinyl esters such as vinyl acetate, vinyl propionate and higher linear and branched acid esters, vinyl ethers. Aromatic vinyl compounds include styrene, a-methyl (styrene and p-tert-butylstyrene and vinyl pyridines. Other ethylenically unsaturated monomers include olefins particulary a-olefines such as ethylene, propylene and butene and diene compounds include butadiene, isoprene, isobutadiene chloroprene and divinylbenzene.

The polymerisation can be carried out to make homopolymers such as poly(vinyl acetate), polystyrene and poly(methyl methacrylate) or copolymers such as ethylene-vinyl acetate copolymers, acrylic copolymers and styrenelacrytic copolymers, styrene-butadiene rubbers and carboxylated styrene-butadiene rubbers, butadiene-acrylonitrife rubbers and chlorinated polymers such as polychloroprene.

The invention is particularly applicable to the manufacture of acrylic copolymers, for example those where at least 50%, more usually at least 60%, desirably at least 80°/a e.g. 90% or more up to 100%, by weight of the monomers are acrylic monomers. The method carried out using acrylic monomers forms a specific aspect of the invention. The acrylic polymers may be those based on mixed alkyl acrylates, especially where the predominant monomer is methyl methacrylate, which copolymers may include anionic units such as (meth)acrylic acid units or cationic units such as amino substituted ethylenically unsaturated monomers such as allyl amine and dially(dimethylammonium chloride.

The amount of surfactant used will depend on the particular monomers used and the polymerisation system used, the degree of colloidal stability needed and the desired particle size of the polymer in the product latex. However, for an otherwise conventional water-in-oil emulsion polymerisation, to give a latex having a particle size of from 80 to 500 nm the amount of surfactant used will typically be from 0.25 to 5 parts by weight surfactant per 100 parts by weight total monomer (phm). More usually the amount will be from 0.5 to 2.5 phm, particularly from 1 to 2 phm.

In microemulsion polymerisation systems, the concentration of monomer is typically substantially lower than in conventional emulsion or other dispersion polymerisation systems e.g. from 3 to 10°/a by weight. The proportion of surfactant relative to the amount of monomer is also relatively high because the microemulsion has higher interface area per unit mass of monomer corresponding to the smaller emulsion particle size. Typical surfactant levels can be from 10 to 150 phm. Overall the solids content of microemulsion systems are usually in the range 15 to 30% by weight of the total emulsion.

Desirably, the compounds of the formula (I) are used as the sole surfactant emulsifier in the polymerisation process of this invention. Of course, mixtures of compounds of the formula (I) e.g. differing in the nature of the group $R^1$, the nature and length of the polyoxyalkylene chain or the nature of the anionic group can be used as can mixtures with the non-ionic alkoxylated unsaturated alcohol precursors, particularly to tailor the properties of the end product polymer. If desired minor amounts of conventional anionic, cationic or non-ionic surfactants may be used. In this context, the presence of 'conventional' materials derived from components of $R^1$ [in formula (I)) in the synthetic raw materials which do not have multiple unsaturation is not considered as adding conventional surfactants.

The polymerisation catalyst in the process in general may be any conventional free radical polymerisation initiator for ethylenically unsaturated systems and in particular for emulsion polymerisation systems. Examples include peroxidic compounds such as inorganic per-compounds e.g. potassium persulphate, and organic per-compounds e.g. tertiary butyl hydroperoxide and other free radical generators such as 2,2'-azobisisobutyronitrile. The proportion of catalyst used will typically be from 0.001 to 10% by weight, and more usually from 0.01 to 7%, based on the total monomer. When a redox couple is used as the initiator, the proportion of reducing agent is typically from 0.05 to 100 mole %, more usually 0.1 to 80%, based on the molar amount of polymerisation initiator.

Other additives in the reaction system can include chain transfer agents, such as alkyl mercaptans and similar acting compounds typically included at from 0 to 5 phm, more usually from 0.1 to 1 phm; crosslinking agents, such as divinyibenzene or ethylene glycol dimethacrylate, typically used to modify the product polymer molecular weight, at typical concentrations of from 0 to 5 phm, more usually from 0.1 to 1 phm; water soluble polymers e.g. hydroxyethylcellulose, carboxymethyl-cellulose, polyethyleneglycot and partially hydrolysed polyvinylacetate, typically used to modify the viscosity of the system, included at concentrations from 0 to 10 phm, more usually from 0.1 to 2 phm; buffers for pH control, sequestering agents, electrolytes and organic solvents in minor amounts totalling typically from 0 to 5 phm, more usually from 0.1 to 3 phm.

The polymerisation reaction can be carried out using generally conventional procedures typically at temperatures in the range from ambient temperature to 100° C., usually 60 to 100° C., desirably from 70 to 95° C. e.g. commonly about 85° C. It is an advantage of the surfactants of the formula (I) used in this invention that they are effective at such elevated temperatures.

The polymerisation process of this invention, particularly as an emulsion, especially an oil-in-water emulsion, polymerisation, can be carried out over a wide pH range for example 3 to 11, particularly 4 to 10, but more usually at moderately acid pH e.g. 3 to 6, especially 4 to 5. After completion of polymerisation, the resultant polymer latices may be neutralised, typically to a pH of 7 to 10 using organic bases e.g. amines or alkanolamines, or inorganic bases e.g. alkali metal hydroxides or carbonates.

Polymerisation reactions can be carried out in a closed kettle equipped with heating and cooling devices, agitation, thermometer, condenser and inlets for inert gas, monomers and initiator streams. All formulation ingredients can be charged to the reactor from the start in what is known in the art as a batch process. The preferred production process used when working with compounds of the present invention is a semi continuous mode. Part of the ingredients are charged to the reactor, the rest is gradually fed into the reactor in single of multiple feed streams. Monomers are fed as a neat monomer stream, or are mixed into a part of the water with a part of the surfactants and optionally other additives to form a pre-emulsion. Monomer composition can change during the feed stage to control particle morphology.

The latices synthesised by the method of this invention have lower levels of free surfactant species than products made using conventional surfactants that are not non-migratory. This yields end-products that can have improved resistance to water, higher colloidal stability, show better adhesion to substrates and other advantages related to reduced levels of free surfactant.

The product polymers obtained by the method of this invention can be used as binders or film formers in interior and exterior architectural coatings, floor coatings, paper and paperboard coatings, coatings for metal protection, waterborne adhesives, inks, binders for non-woven fabrics, concrete and cement additives. Latices can be formulated as such in formulations where water is the carrier, or the polymer can be separated from the aqueous phase by flocculation, spray drying or other known techniques.

The following Examples illustrate the invention. All parts and percentages are by weight unless otherwise stated.

Materials

CS1 'conjugated linoleyl alcohol' 12-ethoxylate made as described in WO/13849 A (based on
  Ocenol 1101130 linoleyl alcohol with an Iodine value from 110 to 130)

The following products were made from CS1 as described below:

S1 neutralised mono-phosphated 'conjugated linoleyl alcohol' 10-ethoxylate.

S2 neutralised di-phosphated 'conjugated linoleyl alcohol' 10-ethoxylate.

S3 mono-phosphated 'conjugated linoleyl alcohol' 6-ethoxylate.

S4 mono-phosphated 'conjugated linoleyl alcohol' 12-ethoxylate.

S5 mono-phosphated 'conjugated linoleyl alcohol' 20-ethoxylate.

S6 mono-phosphated 'conjugated linoleyl alcohol' 30-ethoxylate.

Water-Demineralised water purged with nitrogen for 15 minutes before use

KPS potassium persulphate free radical polymerisation initiator

Test Methods

Viscosity—was measured with a Brookfield RV viscometer using spindle 4 at a speed of 100 rpm (ca 1.7 Hz). Results are given as "Visc" in mPa.s Surface Tension—was measured by the Wilhelmy Plate method with results as "ST" in mN/m.

Particle size—was measured with a Malvern Zetasizer. The Z-average particle size is given as "Z-Ave" in nm and volume average partite size as V-ave in nm.

wet grit—was measured by filtration of latex through a sieve with the result given as the weight % of wet grit based on total latex solids—sieves of 240 μm and 80 μm were used.

Foaming—was measured using the Ross Miles foam test on 0.5% by weight aqueous surfactant solutions or on the latex diluted to 5% solids and results are given as RM Foam Height after 0, 5 and 10 minutes.

Shear Stability—was assessed by subjecting the latex to high shear stirring using a slotted circular paddle stirrer with vertical peripheral extensions at ca 3000 rpm (50 Hz).

Freeze Thaw Stability (FT Stab)—was assessed as the number of 24 hour cycles between −20° C. and 23° C. (12 hours at each temperature that the neutralised test latex withstands without breaking.

Water Spotting (Spot)—was assessed by placing a spat of water on a film made using the latex and ranking the extent to which the film is whitened; 0=complete film whitening and 10=film unaffected. For comparison a film made from a latex polymerised using (saturated) stearyl alcohol 10-ethoxylate mono-phosphate as the surfactant scores 1 on this test.

Contact angle (degrees)—was measured at 1, 5 and 11 minutes after placing a drop of water on a latex film of 150 nm wet thickness dried at 40° for 7 days.

Bloom—was measured by immersing a latex film, 150 nm wet thickness dried at 40°, in water and measuring the °/a haze initially (OH), after 2 hours (2H), 1 day (1 D) and 1 week (1 W) immersion.

Water uptake (°/a) was measured by immersing a. latex film, 150 nm wet thickness dried at 40°, in water and measuring the % water uptake after 1 day (1 D), 5 days (5D) and 2 weeks (2W) immersion.

Synthesis of Phosphated Surfactants

S1-'conjugated linoleyl alcohol' 12-ethoxylate mono-phosphate

Conjugated linoleyl alcohol 12-ethoxylate CSI (400 g; MW 719.2- calculated from the hydroxyl value of the ethoxylate; 0.56 mole) was charged under a nitrogen blanket at ambient temperature to a 1 litre 4-necked round bottom flask equipped with an overhead stirrer, nitrogen blanket adaptor, thermometer, heating mantle and a 500 ml stoppered Kontes powder addition funnel containing powdered $P_2O_5$ (39.5 g; 0.28 mole). The Kontes funnel included a grooved PTFE auger shaft in the outlet tube to control addition of the powder and a small bore tube and with tap to equalise pressure around the main addition tap. The funnel outlet led towards the flask centre to minimise accumulation on the flask walls. The CS1 was heated to 75° C. under stirring at 400 rpm (ca 6.7 Hz). Water (3.6 g) was added to increase the total amount of water in the reaction medium to 1 mole and $P_2O_5$ was added stepwise through the Kontes funnel so that the reaction exotherm raised the temperature to a maximum of 100° C. After completion of the $P_2O_5$ addition, the reaction mixture was heated to 140° C., held at this temperature for 1.5 hours and then cooled to 100° C. Water (21.6 g) was added to bring the total water content to 5% by weight, the mixture held at 100° C. for 0.5 hours and then cooled to ambient temperature. The results of NMR analysis are set out in the Table below. The calculated molecular weight of the product using the monoldi-ester ratio from the NMR analysis was 1065. The phosphoric acid ester was neutralised using ammonia (25°/a; ca 13°/a by weight based on the product) and the mixture further diluted with demineralised water to give a 10°/a by weight active surfactant solution with a pH of 6.8, after equilibrating overnight. This surfactant solution was used in the Examples as the source of surfactant S1.

S2-'conjugated linoleyl alcohol' 12-ethoxylate di-phosphate

Conjugated linoleyl alcohol' 12-ethoxylate CS1 (143.8 g; MW 719.2; 0.2 mole) was charged under a nitrogen blanket at ambient temperature to a flask set up as described above for making the mono-phosphate. The alcohol was dewatered under vacuum (7 mm Hg; ca 130 Pa) for 1 hour under stirring (400 rpm; ca 6.7 Hz), the vacuum was released and the mixture cooled to 70° C. $P_2O_5$ (8.5 g; 0.06 mole) was added stepwise through the Kontes funnel over a period of 25 minutes. The reaction mixture was then heated to 140° C., held at this temperature for 3 hours and then cooled to 900° C. Water (9.0 g) was then to bring the total water content to 5% by weight, the temperature held at 100° C. for 0.5 hours and the mixture was then cooled to ambient temperature. The product was neutralised with ammonia (ca 7% by weight) and diluted generally as described for S1 and the resulting solution designated S2.

The method described for making S1 was also used to make S3 and S4 containing 6 and 12 EO residues respectively but S5 and S6 containing 20 and 30 EO residues respectively the following method using polyphosphoric acid rather than phosphorus pentoxide was used:

S6-'conjugated linoleyl alcohol' 20-ethoxylate mono-phosphate

Conjugated linoleyl alcohol 20-ethoxylate (341 g; 0.325 mole—based on a MW of 1049 calculated from the hydroxyl value of the ethoxylate) was charged under a nitrogen blanket at ambient temperature to a 500 mi round bottom flask equipped with a pressure equalised dropping funnel, agitator, nitrogen blanket adaptor (0.2 ml nitrogen per minute through the flask during the reaction), thermometer, thermostatically controlled heating mantle and a horizontal condenser to a receiver. The ethoxylate was heated to 80° C. to melt it and then polyphosphoric acid (technical grade—84.53% $P_2O_5$, 42.0 g; equivalent to 0.25 mole $P_2O_5$) was gradually added keeping the temperature in the range 80 to 100° C. After completion of the polyphosphoric acid addition, the reaction mixture was heated to 140° C., held at this temperature for 3 hours and then cooled to 90 to 100° C. Water was added to bring the total water content to 5% by weight, the mixture held at 100° C. for 0.5 hours and then cooled to ambient temperature. This surfactant solution was used in the Examples as the source of surfactant S6. Surfactant S7 was made by a similar process but substituting conjugated linoleyl alcohol 30-ethoxylate for the 20-ethoxylate material.

Analysis data on anionic surfactants made by the methods described above and their properties are summarised in the table below:

| Code | EO No | H3PO4 | Mono | Di | Tri | Poly Pro | Free Alcohol |
|---|---|---|---|---|---|---|---|
| | | | Analysis (% by wt) | | | | |
| S1 | 10 | 2.2 | 62 | 32 | 1.6 | 0.1 | 2.5 |
| S2 | 10 | 0.4 | 36 | 60 | ND | 0.2 | 4.3 |
| S3 | 6 | 3 | 67 | 27 | ND | <0.1 | 3 |
| S4 | 12 | 2.7 | 69 | 24 | ND | 0.1 | 4.2 |
| S5 | 20 | 5.6 | 75 | 14 | ND | 0.1 | 5.5 |
| S6 | 30 | 4.6 | 79 | 15 | ND | 0.4 | 1.9 |

Surface Tension (given against Log[surfactant concentration in wt %]) and RM Foam Height at 0.5% surfactant in water for anionic surfactant S4:

| | Surface Tension | | | | RM Foam Height | | |
|---|---|---|---|---|---|---|---|
| Surfactant | 0 | −1 | −2 | −3.3 | 0 | 5 | 10 |
| S3 | | | | | 3 | 2.5 | 2 |
| S4 | 34.3 | 36.5 | 38.2 | 49.2 | 12 | 11.8 | 10.3 |
| S5 | 40.0 | 40.8 | 44.0 | 47.0 | 10.8 | 7 | 6 |

EXAMPLE 1
Batch Emulsion Polymerisation

Batch polymersations were carried out at low solids (10%) to simulate the conditions during the seed stage of a semi-continuous emulsion polymerisation to provide an evaluation of surfactant efficiency during particle nucleation.

Batch recipe:

| Material | (% by wt) | (parts by wt) |
|---|---|---|
| Monomers: | | 100 |
| BA | 48.8 | |
| MMA | 49.9 | |
| MAA | 1.3 | |
| Potassium Peroxidisulphate | | 0.3 |
| Sodium bicarbonate | | 0.1 |
| Water | | 15 |
| S1 | | variable* |
| Water | | to 1000 |

*the differing concentrations of S1 were expressed as phm (parts per 100 parts monomer)

The Z-average particle size of the polymer particles was measured using a Malvern Zetasizer 4 (photon correlation spectroscopy) with the detector at 90°.

| | Z-average article size | |
|---|---|---|
| Run No | S1 amount (phm) | size (nm) |
| 1.1 | 0.5 | 86.4 |
| 1.2 | 0.9 | 76.8 |
| 1.3 | 1.6 | 61.2 |
| 1.4 | 2 | 61.2 |

EXAMPLE 2

Three BA/MMA/MAA (48.8149.911.3 by wt) latices at 45% solids were made by semi-continuous emulsion polymerisation. Two were made using surfactant S1 (Runs 1 and 2) and one, for comparison, using surfactant CS1 (Run 3). The surfactant concentration in the starting emulsion was chosen to give a desired number of particles in the initial polymerisation stage (when using surfactant S1) so as to yield a final latex particle size of 150 nm. The level was calculated from the amount of surfactant used and final particle size distribution in Example 1. The total surfactant concentration was varied from 1.05 to 1.81 phm.

Materials

| For each run four feed mixtures were made up: | | | |
|---|---|---|---|
| | Run 1 | Run 2 | Run 3 |
| 1 Starting emulsion | | | |
| Water | 510.9 | 510.9 | 510.9 |
| Monomers | 61.1 | 61.1 | 61.1 |
| Surfactant solution (10%) | 9.8 | 9.8 | 9.8 |
| 2 Start initiator | | | |
| KIPS | 0.2 | 0.2 | 0.2 |
| Na bicarbonate | 0.06 | 0.06 | 0.06 |
| Water | 20 | 20 | 20 |
| 3 Main monomer feed | | | |
| Monomers | 838.9 | 838.9 | 838.9 |
| Surfactant solution (10%) | 153.1 | 85 | 153.1 |
| Water | 343.7 | 411.8 | 343.7 |
| 4 Feed initiator | | | |
| KIPS | 1.7 | 1.7 | 1.7 |
| Na bicarbonate | 0.6 | 0.6 | 0.6 |
| Water | 60 | 60 | 60 |
| Total | 2000 | 2000 | 2000 |

Production Method

The reactor was a jacketed 2 litre 4 necked round bottom glass flask equipped with an overhead stirrer, thermometer, condenser and supplementary inlets for nitrogen and feed streams.

1 the monomer pre-emulsion was made up by emulsifying the monomer phase in a mixture of the surfactant solution and Water under stirring with a paddle stirrer at 400 rpm (ca 6.7 Hz)
2 the starting emulsion was made in the reactor by charging the water, surfactant and part of the monomer, at a surfactant level to give about $2.3 \times 10^{17}$ polymer particles.
3 the reactor was heated to 85° C. under stirring and the first part of the initiator was added and the reaction was allowed to proceed for 15 minutes under a nitrogen blanket
4 the remainder of the monomer emulsion and initiator feed were fed to the reactor simultaneously in two separate streams over a period of three hours
5 the reactor was kept at polymerisation temperature for a further 90 minutes, then cooled to 30° C.
6 the product emulsion was filtered sequentially through filters with pore sizes of 240 μm and 80 μm and then stored in a bottle.

Example 2 Semi-continuous polymerisation

| Results | Run 1 | Run 2 | Run 3 |
|---|---|---|---|
| Grit >240 Nm (g; wet weighed) | 0 | 0.13 | 18.5 |
| Grit 80–240 pm (g; wet weighed) | 1.7 | 1.6 | n.d. |
| Coagulum (g; wet weighed) | 0 | 0 | 4 |
| Volume average particle size (Nm) | 146.6 | 144.8 | 421.9 / 706.6* |

*multimodal distribution

These data show that the non-ionic ethoxylated 'conjugated linoleyl alcohol' surfactant CS1 was not efficient during the particle nucleation stage of polymerisation using normal amounts of surfactant. The product latices made using the phosphate ester surfactant S1, as well as providing efficient action during particle nucleation, showed better stability during polymerisation resulting in lower levels of macrogrit and coagulum. The latex stabilised with CS1 sedimented after storage over a week end, probably because of its large particle size. No attempt was made to redisperse the sedimented layer prior to sampling for particle size analysis and for this reason, the microgrit level was not determined.

EXAMPLE 3

The batch polymerisation described in Example 1 was re-run using various amount of surfactant S4 instead of the surfactant S1 used in Example 1. The Z-average particle size (in nm) of the latices was measured and the results are set out in the table below:

| | amount of surfactant (phm) | | | | | |
|---|---|---|---|---|---|---|
| | 0.5 | 0.9 | 1.6 | 2 | 5 | 10 |
| neutralised S4 | 86.4 | 76.8 | 61.2 | 61.2 | | |
| non-neutralised S4 | | | | 73.9 | 65.1 | 47.7 |
| NPE6* | | | | | | 101.1 |

*NPE6 is a conventional nonylphenol 6-ethoxylate phosphate surfactant.

These data indicate that even when not neutralised, surfactant S4 is more efficient than the conventional anionic surfactant in emulsifying the monomer. Further data are given in Tables 1, 2 and 3 below.

EXAMPLE 4

Four co-polymer acrylic latices were made by the general semi-continuous method described in Example 2 using anionic surfactant S4. The target latex polymer particle size was 150 nm, the latex polymer solid yield 450 g, the target number of polymer particles $2.3.10^{17}$, and the monomers used were butyl acrylate, methyl methacrylate and methacrylic acid at base ratios of BA/MMA/MAA of 48.8/49.9/1.3. For some runs, the overall percentage of MAA was reduced to 0.5%, with the amounts of BA and MMA adjusted to compensate keeping the ratio of BA to MMA constant. The proportions used are included in Table 1, Latex Particle Size, Shear Stability and Freeze Thaw Stability data are included in Table 2 and water uptake testing data is given in Table 3. For each run four feed mixtures were made up:

| | 4a | 4b | 4c | 4d |
|---|---|---|---|---|
| 1 Starting emulsion | | | | |
| Water | 236.3 | 236.3 | 236.3 | 236.3 |
| Monomers | 29.8 | 29.8 | 29.8 | 29.8 |
| Surfactant solution (20%) | 7.45 | 7.45 | 7.45 | 7.45 |
| 2 Start initiator | | | | |
| KPS | 0.09 | 0.09 | 0.09 | 0.09 |
| Na bicarbonate | 0.04 | 0.04 | 0.04 | 0.04 |
| Water | 10 | 10 | 10 | 10 |
| 3 Main monomer feed | | | | |
| Monomers | 420.2 | 420.2 | 420.2 | 420.2 |
| Surfactant solution (10%) | 26.4 | 49.4 | 71.5 | 49.4 |
| Water | 225.6 | 201.7 | 180.45 | 202.5 |
| 4 Feed initiator | | | | |
| KPS | 0.84 | 0.84 | 0.84 | 0.84 |
| Na bicarbonate | 125 | 1.25 | 1.25 | 0.4 |
| Water | 30 | 30 | 30 | 30 |
| t-butyl hydroperoxide (70%) in | 0.23 | 0.23 | 0.23 | 0.23 |
| Water | 5 | 5 | 5 | 5 |
| Na formaldehyde sulfoxylate in | 0.18 | 0.18 | 0.18 | 0.18 |
| Water | 7.5 | 7.5 | 7.5 | 7.5 |
| Total | 1000 | 1000 | 1000 | 1000 |

EXAMPLES 5 and 6

Runs similar to Example 4 were carried out using anionic surfactant S4 at 0.33 phm in the starting emulsion (1) and S5 (Example 5) and S6 (Example 6) in the main monomer feed (3). The proportions used are included in Table 1, Latex Particle Size, Shear Stability and Freeze Thaw Stability data are included in Table 2 and water uptake testing data is given in Table 3.

TABLE 1

Process Variables and Latex Properties

| Ex No | MAA (%) | Surf. (phm) | Z-ave (nm) | pH | ST (mN/m) | wet grit (%) | Visc (mPa·s) | RM Foam Height 0 | 5 | 10 |
|---|---|---|---|---|---|---|---|---|---|---|
| 3a | 1.3 | 1.5 | 141.3 |  |  |  | 110 | 4.5 | 2 | 0.5 |
| 3b | 1.3 | 2.5 | 143.7 | 2.8 |  |  | 130 | 7.5 | 6.5 | 6 |
| 3c | 0.5 | 2.5 | 1442 | 2.8 |  |  | 110 | 9 | 9 | 8 |
| 4a | 1.3 | 1.5 | 142.4 | 6.02 |  | 0.01 | 60 |  | 3 | 0.5 |
| 4b | 1.3 | 2.5 | 143.1 | 3.15 | 46.8 | 0.02 | 90 | 9.9 | 9.5 | 9 |
| 4c | 1.3 | 3.5 | 145.8 | 2.75 | 48.2 | 0.02 | 130 | 10.8 | 9 | 5.5 |
| 4d | 0.5 | 2.5 | 145.3 | 3.66 | 44.4 | 0.04 | 90 | 10 | 5.5 | 4 |
| 5a | 1.3 | 1.5 | 140.1 | 2.8 |  | 0.04 |  | 6 | 2 | 1.5 |
| 5b | 1.3 | 2.5 | 142.5 | 2.7 |  | 0.01 | 80 | 7.5 | 5 | 3.5 |
| 5c | 0.5 | 2.5 | 143.2 | 2.9 |  | 0.4 | 100 |  |  |  |
| 6a | 1.3 | 1.5 | 142.9 | 3.6 |  | 0.23 | 65 | 3.5 | 0.5 | 0.5 |
| 6b | 1.3 | 2.5 | 143.7 | 3.4 |  |  | 130 | 4 | 3.5 | 3.5 |
| 6c | 0.5 | 2.5 | 141 | 3.7 |  | 0.02 | 120 | 5.5 | 3.5 | 1.5 |

TABLE 2

Latex Testing
Particle Size Shear Stability and Freeze Thaw Stability (FT Stab)

| | non-neutr latex | | Shear Stab | | |
|---|---|---|---|---|---|
| Ex No | Z-ave (nm) | Vol-ave (nm) | Z-ave (nm) | Vol-ave (nm) | FT Stab neutr |
| 3a | 141.3 | 137.5 | 146.7 | 139.5 | 5 |
| 3b | 143.7 | 138.4 | 143.4 | 132 | 5 |
| 3c | 144.2 | 133.3 | 144.5 | 132.3 | — |
| 4a | 142.4 | 127.1 | — | — | 5 |
| 4b | 143.1 | 135.2 | 142.7 | 135.9 | 5 |
| 4c | 145.8 | 141.1 | 144.4 | 136.4 | 5 |
| 4d | 145.3 | 136.5 | — | — | — |
| 5a | 140.1 | 131.2 | — | — | 5 |
| 5b | 142.5 | 130.5 | 170 | 155 | 5 |
| 5c | 143.2 | 136.6 | — | — | — |
| 6a | 142.9 | 135.6 | — | — | 1 |
| 6b | 143.7 | 139.2 | 145.5 | 129 | 5 |
| 6c | 141 | 131.5 | — | — | — |

TABLE 3

Latex film water resistance Testing

| No | Spot | Contact angle 1 min | 5 min | 11 min | Bloom (% Haze) 0 H | 2 H | 1 D | 1 W | Water Uptake (wt %) 1 D | 5 D | 2 W |
|---|---|---|---|---|---|---|---|---|---|---|---|
| 3a |  |  |  |  | 0.9 | 2.6 | 13.3 | 17 | 8 | 13 | 18 |
| 3b |  | 66 | 63 | 55 | 1.9 | 2.8 | 6.8 | 15.5 | 8 | 24 | 25 |
| 3c |  | 66 | 63 | 55 | 0.7 | 2.3 | 12 | 20.7 | 15 | 20 | 33 |
| 4a | 6 | 63 | 62 |  | 0.5 | 2.1 | 9.2 | 24.9 | 10 | 15 | 15 |
| 4b | 6 | 62 | 62 |  | 0.6 | 1.8 | 6.8 | 20.4 | 10 | 17 | 22 |
| 4c |  | 65 | 58 |  | 0.6 | 3.1 | 18 | 66.5 | 10 |  | 70 |
| 4d | 6 | 65 | 59 |  | 1.3 | 3.2 | 8 | 22.7 | 11 | 13 | 19 |
| 5a |  | 71 | 65 | 58 | 0.3 | 2.8 | 13.2 | 34.9 | 6 | 13 |  |
| 5b |  | 62 | 57 | 50 | 0.3 | 3.8 | 22.5 | 64 | 14 | 24 |  |
| 5c |  | 64 | 56 | 49 | 0.9 | 6.1 | 35.2 | 77.2 | 12 | 20 |  |
| 6a |  | 73 | 72 | 68 | 0.5 |  | 25 | 54.4 | 11 | 16 | 24 |
| 6b |  | 77 | 71 | 64 | 0.7 | 4.3 | 22.4 | 47.2 | 13 | 23 | 32 |
| 6c |  | 69 | 64 | 57 | 0.4 | 8.6 | 48.5 | 82 | 12 | 21 | 36 |

What is claimed is:

1. A method of free radical initiated addition polymerisation of at least one ethylenically unsaturated monomer which is or includes at least 50% by weight of at least one acrylic monomer, in which the dispersed phase is stabilised by a surfactant including at least one anionic surfactant compound of the formula (I):

$$R^1\text{—}(OA)_n\text{—}X \qquad (I)$$

where $R^1$ is a $C_{16}$ to $C_{22}$ alkyl group including at least two double bonds;

OA is an oxyalkylene group;

n is from 2 to 60; and

X is a phosphorus acid group including at least one acidic H atom, or a salt thereof.

2. A method as claimed in claim 1 wherein the group $R^1$ is a $C_{16}$ to $C_{22}$ alkyl group including two double bonds which are conjugated.

3. A method as claimed in claim 1 wherein for at least 50% of the compound(s) of the formula (I), X is a phosphate group: —O—P—(O)(OH)$_2$ or a salt thereof.

4. A method as claimed in claim 1 wherein for at least 65% of the compound(s) of the formula (I), X is a phosphate group: —O—P—(O)(OH)$_2$ or a salt thereof.

5. A method as claimed in claim 1 wherein the group OA is an oxyethylene group and n is from 5 to 30.

6. A method as claimed in claim 1 wherein the acrylic monomer(s) represent at least 75% by weight of the ethylenicaliy unsaturated monomer(s).

7. A method as claimed in claim 1 wherein the amount of anionic surfactant used is from 0.25 to 5 parts by weight surfactant per 100 parts by weight total monomer.

8. A method as claimed in claim 1 wherein the temperature of the polymerisation reaction is from 60 to 100° C.

* * * * *